United States Patent [19]

Markle

[11] Patent Number: 5,064,320

[45] Date of Patent: Nov. 12, 1991

[54] CONTROLLED DEPTH CARTRIDGE CASE CAMFERING TOOL

[76] Inventor: Kenneth E. Markle, 2525 Primrose La., York, Pa. 17404

[21] Appl. No.: 709,106

[22] Filed: Jun. 3, 1991

[51] Int. Cl.$^5$ .............................................. B23B 45/06
[52] U.S. Cl. ....................................... 408/202; 7/157; 29/1.32; 86/33; 408/233; 408/241 S
[58] Field of Search ............... 408/202, 227, 229, 231, 408/233, 241 S; 29/1.11, 1.32; 86/31, 33; 7/157

[56] References Cited

U.S. PATENT DOCUMENTS

| | | | |
|---|---|---|---|
| 780,728 | 1/1905 | Pendergast | 408/229 |
| 2,317,615 | 4/1943 | Johnson | 408/202 |
| 2,359,954 | 10/1944 | Whipple | |
| 2,875,651 | 3/1959 | Kissinger et al. | 408/233 |
| 3,199,168 | 8/1965 | Rhine | |
| 4,405,269 | 9/1983 | Hertzler | 29/1.32 |
| 4,468,829 | 9/1984 | Christensen | |
| 4,521,145 | 6/1985 | Bieler | |
| 4,686,751 | 8/1987 | Gracey | |
| 4,860,453 | 8/1989 | Carroll | |

*Primary Examiner*—Daniel W. Howell
*Attorney, Agent, or Firm*—Samuel M. Learned, Jr.

[57] ABSTRACT

A controlled depth cartridge case chamfering tool and method for use thereof in firearm cartridge loading and reloading operations, which enables the adjustably set repeatedly uniform taper chamfering of the mouth interior of a sized and trimmed cartridge case to provide a consistently uniform radially aligned and squarely disposed truncated conically shaped gradual taper therewithin and thereby allow for a greater ease of insertion and smoothness of seating of a bullet tip during loading or reloading operations without the otherwise inherent hazard of heel and base marring or damage thereto.

8 Claims, 2 Drawing Sheets

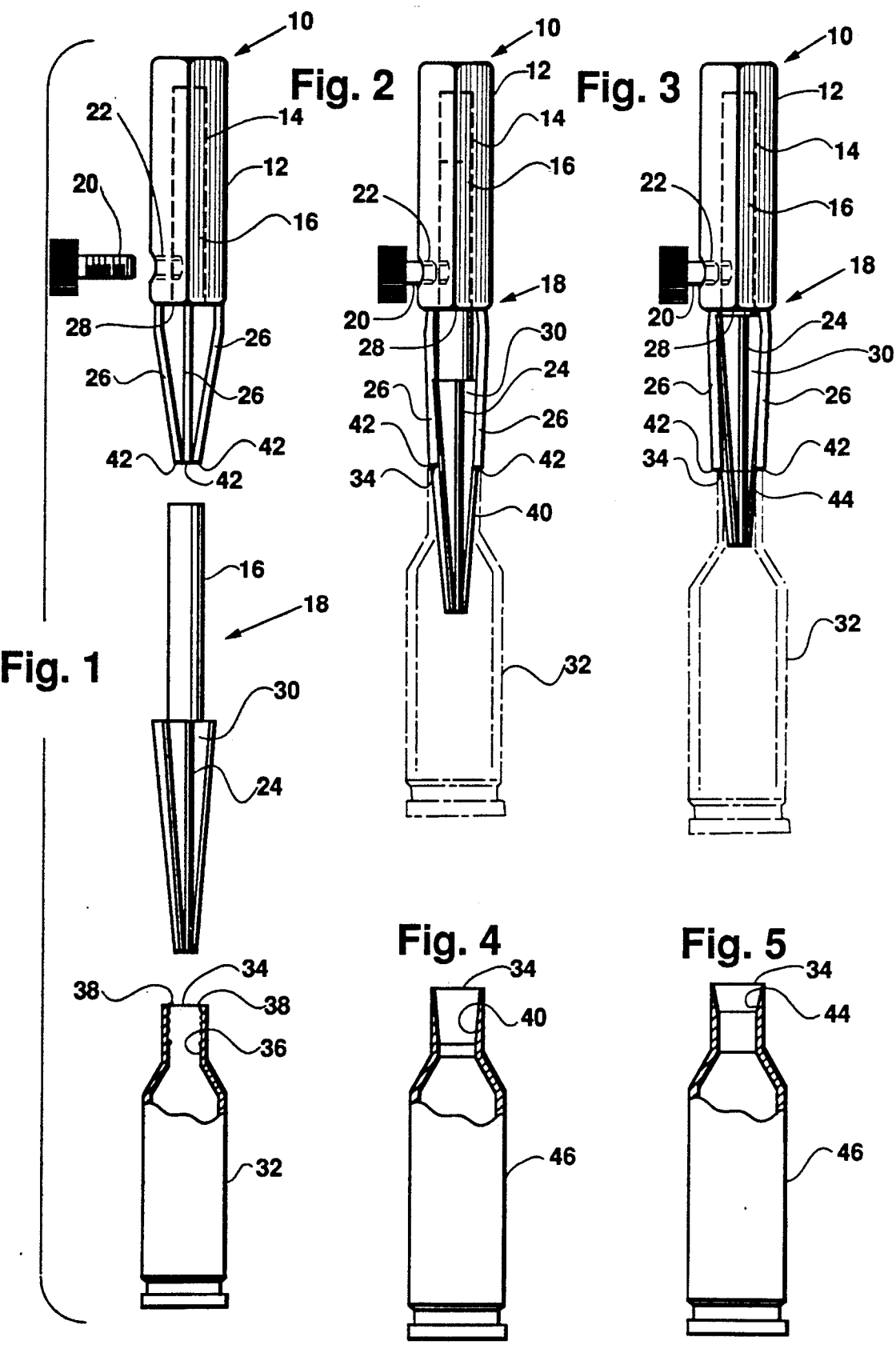

CONTROLLED DEPTH CARTRIDGE CASE CAMFERING TOOL

BACKGROUND OF THE INVENTION

The present invention relates to controlled depth cartridge case chamfering tool for use in preparing both new cases and the cases of spent firearm cartridges for loading or reloading operations, and in particular to the loading and reloading of rifle cases to furnish cartridges for both high accuracy sport shooting as well as precision bench rest shooting, wherein the tool of instant invention enables one to manually accomplish a gradual truncated conically shaped taper chamfering of a sized and trimmed cartridge case, extending from the case mouth internal circumferential edge to within the neck interior thereof.

One of the standard preparation operations performed in the processing of spent cartridge cases for reloading, which is a procedure well known in the art among those who practice such activity, is that of deburring and reaming a bevel about the interior circumferential case mouth opening of resized and trimmed cases to thereby more easily enable the positioning and receiving of a bullet tip for seating. And, in most pistol and rifle cartridge reloading operations the reaming tool deburring and beveling of cartridge case mouths is both an adequate and satisfactory measure for facilitating bullet tip seating, as well as providing cartridges of satisfactory quality for general purpose hunting and shooting.

Exemplary tools available for accomplishing the ream deburring and beveling of the cartridge case interior circumferential mouth opening, which tools are adjustable to accommodate cases of different sized bullet calibers, would include those as respectively taught in U.S. Pat. No. 4,468,829 to Christensen dated Sept. 4, 1984, and U.S. Pat. No. 4,860,453 to Carroll dated Aug. 29, 1989, both of which tools feature three-bladed scrape-reamers for interior case mouth deburring and bevel cutting to produce a very blunt case mouth entry for bullet tip positioning and seating.

Additionally, the teaching set forth in U.S. Pat. No. 2,359,954 to Whipple dated Oct. 10, 1944, discloses a rotating cutting tool for the deburring of a cartridge case mouth and the chamfering of the internal circumferential edge thereof at a 45-degree angle. Rhine, in U.S. Pat. No. 3,199,168 dated Aug. 10, 1965, teaches an adjustable cartridge case mouth trimming and internal circumferential edge chamfering tool adapted to be used in combination with a power tool drive. The device shown in U.S. Pat. No. 4,686,751 to Gracey dated Aug. 18, 1987, teaches a resized cartridge case neck trimming and case mouth deburring tool which indexes trim completion on the shoulder of a resized case. Again, all of the additional above cited prior art references show tools which bevel the case mouth opening to produce a very blunt case mouth entry for bullet tip positioning and seating, which is adequate in producing cases which will provide cartridges of satisfactory quality for general purpose hunting and shooting.

For those, however, interested in loading or reloading so called "match" ammunition for high accuracy sport shooting or precision bench rest shooting there is an aspect of accuracy potential with respect to cartridge quality that results from the mere scratching, marring, or deforming of the bullet tip base or heel, a hazard inherently resultant from operations performed during the positioning and seating of a bullet tip in accomplishing loading or reloading operations. And, one major contributing cause for such bullet tip base or heel defects results when one attempts to position and seat a bullet tip through a blunt beveled cartridge case mouth opening which is not profiled to incrementally receive a bullet tip for positioning, and subsequently for seating. Thus, if one is able to provide a tapered chamfer at the cartridge case mouth opening, which gradually extends conically down into the neck, rather than a blunt shallow chamfer such as is obtained when using currently available deburring and chamfering tools, then the ease of bullet tip positioning and seating is substantially enhanced with a corresponding reduction in the liklihood of damage to the bullet tip base or heel during such operations, thus enabling the retention of optimum cartridge factor accuracy aspects with regard thereto.

Secondly, there is a technique of bullet tip seating known as "heel seating" which is employed primarily by precision bench rest shooters as a method to even further enhance the cartridge factor accuracy potential, and consists of bullet tip seating within the case neck by periperal contact only of the bullet tip heel lightly about a relatively deep truncated conically shaped neck interior, which further minimizes the potential for bullet tip damage during placement and seating operations, and additionally enables the bullet tip to thereafter conformably seat within the barrel bore of the firearm upon chambering and closing and locking of the firearm action, which additionally enhances cartridge factor accuracy potential by not firing a mechanically stressed bullet. None of the above cited prior art teachings provide the mechanical capability for taper cutting a cartridge case mouth in preparation thereof for the heel seating technique as does the adjustable depth taper chamfering tool disclosed and taught herein by applicant.

Thus, the applicant herein by his invention furnishes a new and novel tool to provide a true cartridge case mouth taper chamfering capability, the use of which enhances substantially the loaded and reloaded cartridge factor accuracy potential by first reducing the liklihood of bullet tip base or heel damage during the placement and seating operation thereof, and also provides a mechanical capability for preparing cartridge cases adapted to employ the heel seating technique for even greater cartridge factor accuracy potential as above described.

SUMMARY OF THE INVENTION

It is the principal object of the present invention to provide a controlled depth cartridge case chamfering tool having an adjustably set depth stop that will enable the repeatably uniform truncated conically shaped taper chamfering consistently from case-to-case of the mouth interior of sized and trimmed cartridge cases for loading or reloading.

It is another object of the present invention to provide a controlled depth cartridge case chamfering tool having an adjustably set three-pronged radially spaced chamfer reaming cutter depth stop which mechanically enables additionally the consistently uniform radially aligned squareness of interior case mouth truncated conically shaped chamfering from case-to-case.

It is also an object of the present invention to provide a controlled depth cartridge case chamfering tool having a six-fluted reamer, which enhances the mechanical smoothness, as well as ease and uniformity of interior case mouth chamfer cutting.

Still another object of the present invention is to provide a controlled depth cartridge case chamfering tool which will adjustably handle the variably adjustable depth set of interior case mouth chamfering for a variety of cartridge cases sized within the range to receive bullet tip diameters from .22 caliber to .30 caliber inclusive.

A further object of the present invention is to provide a controlled depth cartridge case chamfering tool which accomplishes reaming of a uniformily gradual truncated conically shaped taper chamfering angle within case mouth interiors to thereby enable the ease of insertion and uniformily smooth seating of a bullet tip during the loading or reloading process.

Yet another object of the present invention is to provide a controlled depth cartridge case chamfering tool which cuts a uniform and gradual truncated conically shaped interior case mouth chamfer that enables bullet tip insertion and the seating thereof during loading or reloading operations without the otherwise inherent hazard of bullet heel and base marring or damage.

It is also an object of the present invention to provide a controlled depth cartridge case chamfering tool which will adjustably accommodate the repeatedly uniform truncated conically shaped deep taper chamfering of case mouth interiors so that bullet tips may be heel seated to thereby allow for the self alignment of a bullet tip within the barrel bore upon the reloaded cartridge chambering and closing and locking of a firearm action.

The foregoing, and other objects hereof, will be readily evident upon a study of the following specification and accompanying drawings comprising a part thereof.

BRIEF DESCRIPTION OF THE DRAWINGS

FIG. 1 is an exploded side elevation view of the component parts comprising the controlled depth cartridge case chamfering tool of instant invention, shown disposed in use relation to an exemplary sized and trimmed cartridge case.

FIG. 2 is an assembled side elevation view of the tool of instant invention adjusted to show the exemplary use thereof in accomplishing deep taper chamfering of a sized and trimmed cartridge case mouth interior.

FIG. 3 is an assembled side elevation view of the tool of instant invention, adjusted to show the exemplary use thereof in accomplishing shallow taper chamfering of a sized and trimmed cartridge case mouth interior.

FIG. 4 is a cut-away side elevation view of an exemplary sized and trimmed cartridge case the mouth interior of which has been deep taper chamfered by use of the tool of instant invention.

FIG. 5 is a cut-away side elevation view of an exemplary sized and trimmed cartridge case the mouth interior of which has been shallow taper chamfered by use of the tool of instant invention.

DETAILED DESCRIPTION OF THE INVENTION

Figure 6:
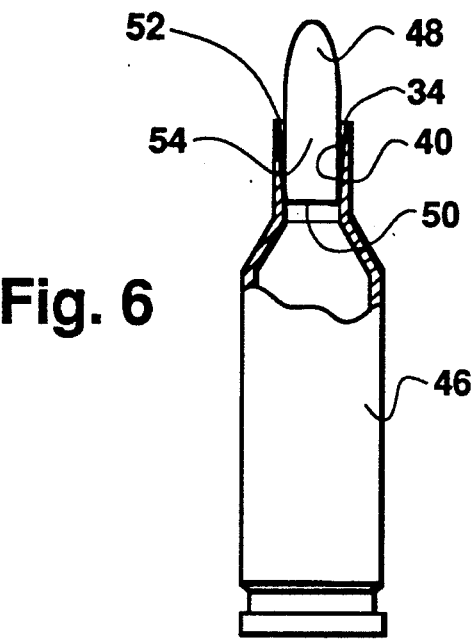
FIG. 6 is a cut-away side elevation view of the exemplary cartridge case as previously shown in FIG. 4, with an exemplary bullet tip heel seated therein.

Referring to FIG. 1, the controlled depth cartridge case chamfering tool 10 of instant invention, and the component parts thereof comprising the same are shown in an exploded side elevation assembly view, which component parts consist of an elongated handle 12 having provided therein a centrally intermediate axially aligned elongated reamer shaft receiving opening 14 adapted to adjustably receive in close slidable conformity therewith the chucking shaft 16 of a reaming cutter tool 18 for adjustable depth retention therein by means of perpendicularly applied engagement force exerted by a set bolt 20 through the threaded handle opening 22 compressively against said chucking shaft 16 to thereby position and retain the tapered cutting blades 24 of said reaming cutter tool 18 in an adjustably set fixed longitudinal retention relationship with respect to the handle retained cutter depth stop guides 26, which guides 26 are affixedly assembled within the handle base 28 and dependably extended therefrom a uniform distance to cooperatively engage respectively with spring biased compression successively alternate blade flutes 30 of said reaming cutter tool 18.

Also shown in FIG. 1 is an exemplary sized and trimmed fired cartridge case 32, being shown as the same would typically appear after having been processed through a case resizing die to thereby return the fired and expanded case back to firearm chambering size, and then have the excess case metal extension from the resizing operation trimmed from the case mouth opening 34 to bring the resized case back to the proper chambering length. Thereafter, the remaining case mouth opening 34 processing operation to be accomplished in accepted cartridge reloading procedures is to at least bevel the case mouth opening interior periphery 36 so as to remove the trimming burrs 38 and provide for easier bullet tip positioning within and entry thereof into the case mouth opening 34 during bullet tip seating operations. Preferably, however, the case mouth opening 34 and interior periphery 36 thereof should be prepared in such a manner so as not only provide for facilitated bullet tip positioning and seating, but also reasonably enable bullet tip positioning and seating without the hazard of either deforming, or marring or scratching the bullet tip base or heel which can have a pronounced and significant effect on inherent accuracy characteristics of a loaded or reloaded cartridge.

Referring now to FIG. 2 to explain in greater detail the controlled depth cartridge case chamfering tool 10 and the method and advantages in the use thereof, wherein said tool 10 is shown operationally assembled and adjusted for accomplishing a relatively deep chamfer cut 40 within an exemplary case mouth opening interior periphery 36 of an exemplary sized and trimmed cartridge case 32 which is shown in phantom. It should be noted as shown that the reaming cutter tool 18 is provided with gradually tapered cutting blades 24, and that both the diameter and depth of a case mouth opening interior periphery taper cut is a function of the case mouth opening caliber, which equates to diameter, in relation to the longitudinally extended set of the tapered cutting blades 24 with respect to the cutter depth stop guide tips 42. It is the foregoing variably adjusted and set taper cutting blade 24 to cutter depth depth stop guide tip 42 relationship, which is accommodated by slidable displacement of the chucking shaft 16 within the reamer shaft receiving opening 14, which once adjusted for a particular diameter and depth of cut, and then operationally set by means of compressive engagement of the set bolt 20 by being exerted against the chucking shaft 16 through the threaded handle opening 22, that enables the adjustably set repeatedly uniform taper chamfering of the case mouth opening 34 and the interior periphery 36 thereof of a sized and trimmed cartridge case within the range to receive bullet tip diameters from .22 caliber to .30 caliber inclusive. Once the tool 10 is set as above described for a particular run or lot of similar caliber sized and trimmed cartridge cases 32, then, as in the instant example of discussion, the relatively deep chamfer cut 40 is unifomrimly repeated from case-to-case by virtue first of the repeatable self-centering characteristics of the tapered reaming cutter 18 within a case mouth opening 34, and second upon commencement of manual rotation thereof by means of the attached elongated handle 12 to execute the taper cut by virtue of the uniform depth of cut achieved when the cutter depth stop guide tips 42 come into a positive-stop uniform rotational contact with the case mouth opening 34. It is this latter aspect also, being the positive-stop uniform rotational contact of the cutter depth stop guide tips 42 with the case mouth opening 34 as the tool 10 is manually rotated, which mechanically enables additionally the consistently uniform radially aligned squareness of the case mouth opening interior truncated conically shaped chamfering from case-to-case, as presently exemplified herein with regard to the tool 10 set for accomplishing a relatively deep chamfer cut 40.

The view shown in FIG. 3 illustrates adjustment set of the chamfering tool 10 to accommodate and accomplish a relatively shallow chamfer cut 44, which would typically be the case mouth neck chamfering for either a high accuracy sport shooting or hunting load with case neck crimping about the bullet base after loading, or the setting to accommodate taper chamfering of the case mouth opening interior periphery 36 of a smaller caliber cartridge case. Adjustment of the reaming tool cutter 18 with respect to the depth and diameter of taper chamfering cut as well as with respect to the cutter depth stop guides 26 is by threadable retraction of the set bolt 20, then slidable retractable adjustment of the reaming cutter tool 18 chucking shaft 16 within the reamer shaft receiving opening 14 as shown, followed by a retightening of the set bolt 20 within the threaded handle opening 22 to thereby exert compressive re-set force of the set bolt 20 upon the chucking shaft 16, and lock the reamer cutting tool in an adjusted operable position.

Preferably, the reaming cutter tool 18 is provided with six cutting blades 24 each having a 4-degree taper, and six corresponding blade flutes 30 for chamfer cutting chip removal, which dimensional and structural characteristics provide both for facilitated reamer cutting and ease of manual manipulation thereof in executing either a relatively deep 40, or relatively shallow chamfer cut 44.

The views shown in FIG. 4 and FIG. 5 respectively illustrate in partially cut-away side elevation views an exemplary finished neck chamfered case 46, first as the same would typically appear with a relatively deep chamfer cut 40 such as depicted in FIG. 4, and secondly a relatively shallow chamfer cut as depicted in FIG. 5. When the respective views shown in FIGS. 4 and 5 are compared to the case mouth opening interior periphery 36 of the exemplary sized and trimmed cartridge case 32 shown in FIG. 1, the preparation of the case mouth opening 34 for facilitated bullet tip positioning and seating can be readily seen.

The view shown in FIG. 6 illustrates heel seating of an exemplary bullet tip 48 within the relatively deep chamfer cut 40 of a finished neck chamfered case 46, wherein the bullet tip base 50 is snugly but lightly seated within the case neck as shown, being dimensionally centered within the case mouth opening 34 and having a free annular clearance 52 about the case mouth opening 34 and the bullet tip mid-section 54. It is the heel seating technique of bullet tip 48 loading which is employed for singly loaded rounds used in precision bench rest shooting, which enables the bullet tip to angularly rotate and conformably seat within the barrel bore of a firearm upon chambering of the round and closing and locking of the firearm action, thereby enhancing cartridge factor accuracy potential by not having to fire a mechanically stressed bullet.

Figure 7:
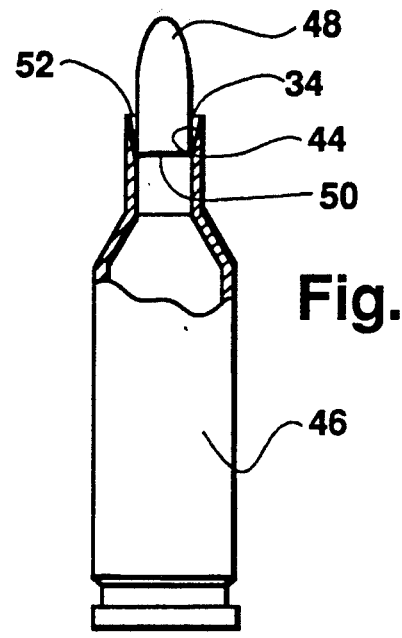
FIG. 7 is a cut-away side elevation view of the exemplary cartridge case as previously shown in FIG. 5, with an exemplary bullet tip seated therein for neck crimping.

Referring to FIG. 7 there is shown the typical bullet tip 48 seating within a relatively shallow chamfer cut 44 to produce a high accuracy sport shooting or hunting load, wherein the case mouth opening 34 is thereafter crimped about the bullet tip base 50 to thereby firmly hold the bullet tip in place for withstanding the mechanical rigors of use in a magazine fed firearm, which is the typical mode of cartridge loading in sport shooting and hunting firearms. Because of the taper chamfering of the case neck mouth interior, however, as with the previously illustrated relatively deep chamfer cut load as shown in FIG. 6, and the relatively shallow chamfer cut 44 load as shown in FIG. 7, the case mouth opening is thereby configured such as to preclude, when one exercises reasonable care and attention in accomplishing bullet tip 48 placement and seating operations, the liklihood of scratching, marring, or deforming the bullet tip base 50, and a loss of inherent cartridge accuracy as a consequence of such bullet tip base 50 damage incurred during bullet tip 48 placement and seating is for practical purposes eliminated.

Figure 8:
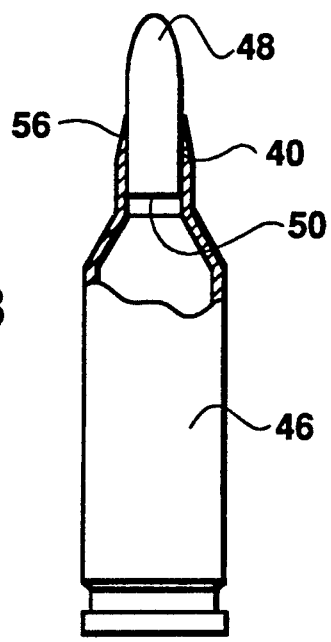
FIG. 8 is a cut-away side elevation view similar to that as previously shown in FIG. 6, with the heel seated bullet tip neck crimped within the case mouth opening.
Figure 9:
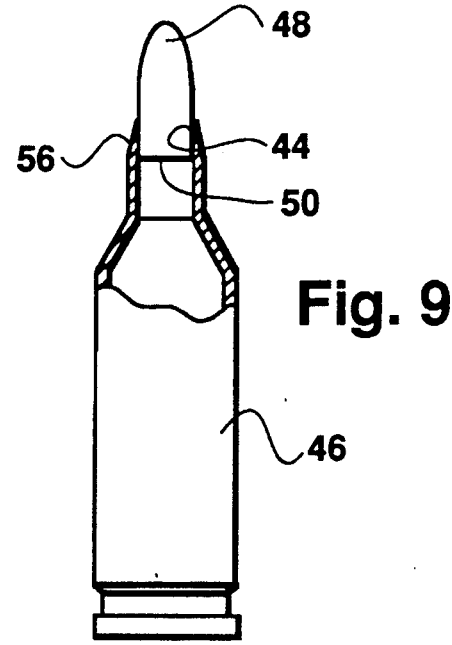
FIG. 9 is a cut-away side elevation view similar to that as previously shown in FIG. 7, with the seated bullet tip neck crimped within the case mouth opening.

The respective views shown in FIGS. 8 and 9 illustrate neck crimping 56 of the relatively deep chamfer cut 40 seated bullet 48 and then the relatively shallow chamfer cut 44 seated bullet 48, which in the loading of a deep chamfer cut seated bullet may be done, and in the loading of a shallow chamfer cut seated bullet is typical.

Although the controlled depth cartridge case chamfering tool invention hereof, and the structural characteristics and method of employment thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

I claim:

1. A controlled depth cartridge case chamfering tool for accomplishing adjustably set repeatedly uniform taper chamfering of the mouth interior of a sized and trimmed cartridge case to provide a consistently uniform radially aligned and squarely disposed truncated conically shaped gradual taper therewithin respectively from case-to-case within a run lot and thereby facilitate bullet tip placement and seating in accomplishing cartridge loading or reloading operations, comprising:

(a) an elongated handle provided with a reamer shaft receiving opening;

(b) a reaming cutter tool having integral thereto a chucking shaft adapted to be slidably supported within said reamer shaft receiving opening;

(c) a means in said handle to lockably secure said chucking shaft at a variably set adjusted position within said elongated handle; and (d) a plurality of radially spaced reaming cutter tool depth stop guides extending from the base of said elongated handle cooperatively with said reaming cutter tool and adapted to adjustably limit the depth of case mouth interior depth of chamfering cut thereof.

2. The tool according to claim 1 wherein said means to lockably secure said chucking shaft at a variably set adjusted position within said elongated handle is a set bolt.

3. The tool according to claim 1 wherein said reaming cutter tool is provided with a set of six blades and six corresponding complementary flutes.

4. The tool according to claim 3 wherein said blades are tapered at an angle of 4-degrees to the chucking shaft long axis.

5. The tool according to claim 1 wherein said depth stop guides are resilient to engage said reaming cutter tool within successively alternate flutes thereof.

6. The tool according to claim 5 wherein the number of depth stop guides is three.

7. The tool according to claim 5 wherein the adjustable set thereof is such as to enable a relatively deep chamfer cut of a case mouth interior.

8. The tool according to claim 5 wherein the adjustable set thereof is such as to enable a relatively shallow chamfer cut of a case mouth opening.

* * * * *